(12) United States Patent
Konnola et al.

(10) Patent No.: US 9,547,629 B2
(45) Date of Patent: Jan. 17, 2017

(54) EFFICIENT CREATION OF WEB FONTS

(71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

( * ) Notice: Subject to any disclaimer, the term of this patent is extended or adjusted under 35 U.S.C. 154(b) by 214 days.

(21) Appl. No.: 14/093,230

(22) Filed: Nov. 29, 2013

(65) Prior Publication Data
US 2015/0154152 A1 Jun. 4, 2015

(51) Int. Cl.
*G06F 17/00* (2006.01)
*G06F 17/21* (2006.01)

(52) U.S. Cl.
CPC ................... *G06F 17/214* (2013.01)

(58) Field of Classification Search
CPC ...................................... G06F 17/214
USPC ........................................... 715/269
See application file for complete search history.

(56) References Cited

U.S. PATENT DOCUMENTS

| | | | |
|---|---|---|---|
| 5,586,241 A * | 12/1996 | Bauermeister ........ | G06T 11/203 345/170 |
| 5,710,880 A * | 1/1998 | Howlett et al. ............... | 345/468 |
| 5,940,581 A * | 8/1999 | Lipton .................. | G06F 17/214 358/1.11 |
| 6,065,008 A * | 5/2000 | Simon .................... | G06F 17/214 |
| 6,426,751 B1 * | 7/2002 | Patel ..................... | G06F 17/214 345/468 |
| 6,954,898 B1 * | 10/2005 | Nakai .................... | G06F 17/214 715/262 |
| 7,574,486 B1 * | 8/2009 | Cheng ............... | G06F 17/30905 707/999.01 |
| 8,397,155 B1 * | 3/2013 | Szabo ................... | G06F 17/211 715/209 |
| 9,323,726 B1 * | 4/2016 | Joshi .................... | G06K 9/4671 |

(Continued)

FOREIGN PATENT DOCUMENTS

| | | |
|---|---|---|
| EP | 0551997 A1 | 7/1993 |
| EP | 1201414 A2 | 5/2002 |
| JP | 06211007 A | 8/1994 |

OTHER PUBLICATIONS

Aaron A. Alino, Advancements in Web Typography (WebFonts and WOFF), California Polytechnic State University, 2010, p. 10.*

(Continued)

*Primary Examiner* — Laurie Ries
(74) *Attorney, Agent, or Firm* — Young & Thompson

(57) ABSTRACT

A computer implemented method for preparing font information related to textual content of a received document includes determining a font data complying a font format relating to a textual content of the received document file. The font format is compared to a predetermined common font data format and the font format is converted to the predetermined common font data format if the comparison indicates a mismatch of the compared font data formats. A font file in the predetermined common font data format is created from the converted font data and also at least one web font file is created from the created font file. Finally, at least the font file complying with the predetermined common font data format and the at least one predetermined web font file are stored in a memory. A system and a non-transitory computer readable medium for storing computer program code are also described.

26 Claims, 3 Drawing Sheets

(56) References Cited

U.S. PATENT DOCUMENTS

| | | | |
|---|---|---|---|
| 2004/0049737 A1* | 3/2004 | Simon Hunt | G06F 17/30905 715/238 |
| 2007/0044882 A1 | 3/2007 | Cowger et al. | |
| 2008/0071739 A1* | 3/2008 | Kumar | G06F 17/30864 |
| 2008/0177782 A1* | 7/2008 | Poston | G06F 17/2288 |
| 2008/0177799 A1* | 7/2008 | Wilson | G06F 21/64 |
| 2011/0252160 A1* | 10/2011 | Wu | G06F 17/227 709/246 |
| 2013/0174017 A1* | 7/2013 | Richardson | G06F 17/21 715/234 |
| 2013/0326329 A1* | 12/2013 | Goel | G06F 17/30893 715/234 |
| 2014/0096033 A1* | 4/2014 | Blair | G06F 3/01 715/752 |
| 2014/0325407 A1* | 10/2014 | Morris | G06F 3/04842 715/765 |
| 2015/0088977 A1* | 3/2015 | Monesson | H04L 65/605 709/203 |
| 2015/0161082 A1* | 6/2015 | Levien | G06F 17/214 715/235 |

OTHER PUBLICATIONS

R. Marti et. al., The Linear Ordering Problem, Springer-Verlag, 2011, p. 17.*

Torben, How to create perfect web-fonts in 3 steps, Pixels|Bytes, Nov. 24, 2013.*

Aaron A. Alino, Advancements in Web Typography (WebFonts and WOFF), California Polytechnic State University, 2010, p. 10, 13.*

Tom Green et al., Foundation Adobe Edge Animate, Springer, 2012, p. 174.*

Extended European Search Report, dated Sep. 15, 2014, from corresponding EP application.

* cited by examiner

EFFICIENT CREATION OF WEB FONTS

TECHNICAL FIELD

The invention concerns in general the technical field of data processing. Especially the invention concerns preparation of textual content for visualization.

BACKGROUND OF THE INVENTION

The tremendous increase in utilization of computers and mobile terminals in the representation of documents has established a development of applications for viewing the documents in different data formats. Most known examples are Microsoft Office and Adobe Acrobat applications. Nowadays a typical situation is that a user is reviewing a document with his or her terminal device wherein the document is downloaded from a server residing in Internet. In such use case there needs to be a specific viewer application for the document in the terminal device which is capable of interpreting the document data in order to display the document content.

In order to mitigate this, an approach which processes proprietary formatted document file into HTML is devised. Part of the document file content defines visual presentation of the text in the document, and thus impacts the layout, visual characteristics and general readability of the document.

In order to allow this visual character information properly reproduced by HTML supporting applications in the terminal device, a method for downloading font files has been developed. These downloadable font assets are called web fonts. However, support for downloadable web fonts in the terminal device is limited to some font types only, and often the proprietary formatted document contains/refers to font data which is of different format.

Thus, there is need to introduce sophisticated solution which allows efficient way to convert font files not suitable for web font presentation into formats which are suited for that purpose.

SUMMARY OF THE INVENTION

An objective of the invention is to present a computer implemented method, a system and computer program code stored in non-transitory computer readable medium for preparing textual content. Another objective of the invention is that the method, the system and the computer program code introduce solution for preparing the textual content in a manner that at least one web font can be efficiently created.

The objects of the invention are reached by computer implemented method, system and computer program code as defined by the respective independent claims.

According to a first aspect, a computer implemented method for preparing font information related to textual content of a document is provided, wherein the method comprises receiving a document file as an input; determining at least a font data complying a font format relating to a textual content of the received document file; comparing the font format of the determined font data to a predetermined common font data format; converting the font format of the font data to the predetermined common font data format if the comparison indicates a mismatch of the compared font data formats; creating a font file in the predetermined common font data format from the converted font data; creating at least one web font file from the created font file; and storing at least the font file complying with the predetermined common font data format and the at least one predetermined web font file in a memory.

The determination of at least the font data complying a font format may be performed by parsing the content of the received document file, the parsing comprising at least extracting one or more data items comprising the font data from font information embedded in the received document file.

Alternatively or in addition, the determination of at least the font data comprises detection of an indication in the received document file that an external font file is relating to the received document file, loading the external font file and parsing the content of the loaded font file, the parsing comprising at least extracting one or more data items comprising the font data from the loaded font file.

The method may further comprise a step of analyzing and correcting font information prior to comparison of the font format of the determined font data to a predetermined common font data format. The correction may comprise at least one of the following: forming Unicode compliant character encoding of the determined font data, determining applicable font metrics data on a basis of determined font metrics data, completing the determined font data.

The predetermined common font data format may be TrueType Font (TTF) and the method may further comprise a step of determining if the font data in the predetermined common font data format comprises hinting information and in response to a detection of absence of hinting information determining the hinting information to the font data in the predetermined common font data format prior to creating the at least one web font file. Moreover, the method may further comprise a step of adding the hinting information to the font data in the predetermined common font data format in response to the determination of the hinting information. The determination of the hinting information may be performed with heuristic operation.

The created web font files may be in Embedded Open Type Format, EOT, and Web Open Font Format, WOFF, and the stored files are the following: a web font file complying Embedded Open Type format, EOT, a web font file complying Web Open Font Format, WOFF, and font file complying TTF format.

According to a second aspect, a system for preparing font information related to textual content of a document is provided, the system comprising one or more processors, a memory including computer program code, wherein the memory and the computer program code configured to, with the processor, cause the system at least to perform the following: receive a document file as an input; determine at least a font data complying a font format relating to a textual content of the received document file; compare the font format of the determined font data to a predetermined common font data format; convert the font format of the font data to the predetermined common font data format if the comparison indicates a mismatch of the compared font data formats; create a font file in the predetermined common font data format from the converted font data; create at least one web font file from the created font file; and store at least the font file complying with the predetermined common font data format and the at least one predetermined web font file in a memory.

The system may be configured to determine at least the font data complying a font format by parsing the content of the received document file, the parsing comprising at least extracting one or more data items comprising the font data from font information embedded in the received document file. Alternatively or in addition, the system may be configured to determine at least the font data by detecting an indication in the received document file that an external font file is relating to the received document file, by loading the external font file and by parsing the content of the loaded font file, the parsing comprising at least extracting one or more data items comprising the font data from the loaded font file.

The system may further be configured to analyze and correct font information prior to comparison of the font format of the determined font data to a predetermined common font data format.

The system may be configured to use TrueType Font (TTF) as the predetermined common font data format and the system may further be configured to determine if the font data in the predetermined common font data format comprises hinting information and in response to a detection of absence of hinting information to determine the hinting information to the font data in the predetermined common font data format prior to creating the at least one web font file. The system may further be configured to add the hinting information to the font data in the predetermined common font data format in response to the determination of the hinting information. Additionally, the system may be configured to determine the hinting information by performing at least one heuristic operation.

The system may be configured to create web font files in format of Embedded Open Type, EOT, and Web Open Font, WOFF, and to store: a web font file complying Embedded Open Type format, EOT, a web font file complying Web Open Font Format, WOFF, and font file complying TTF format. According to a third aspect, a non-transitory computer readable medium for storing computer program code is provided that, when executed by a system, causes the system to perform a method for preparing font information related to textual content of a document, in the method: receiving a document file as an input; determining at least a font data complying a font format relating to a textual content of the received document file; comparing the font format of the determined font data to a predetermined common font data format; converting the font format of the font data to the predetermined common font data format if the comparison indicates a mismatch of the compared font data formats; creating a font file in the predetermined common font data format from the converted font data; cresting at least one web font file from the created font file; and storing at least the font file complying with the predetermined common font data format and the at least one predetermined web font file in a memory.

The execution of the computer program code may cause determination of at least the font data complying a font format by parsing the content of the received document file, the parsing comprising at least extracting one or more data items comprising the font data from font information embedded in the received document file. Alternatively or in addition, the execution of the computer program code may cause determination of at least the font data by detecting an indication in the received document file that an external font file is relating to the received document file, loading the external font file and parsing the content of the loaded font file, the parsing comprising at least extracting one or more data items comprising the font data from the loaded font file.

The execution of the computer program code may cause analyzing and correcting font information prior to comparison of the font format of the determined font data to a predetermined common font data format. The correction may comprise at least one of the following: forming Unicode compliant character encoding of the determined font data, determining applicable font metrics data on a basis of determined font metrics data, completing the determined font data.

The predetermined common font data format may be TrueType Font (TTF) and the execution of the computer program code may cause determination if the font data in the predetermined common font data format comprises hinting information and in response to a detection of absence of hinting information determining the hinting information to the font data in the predetermined common font data format prior to creating the at least one web font file. The execution of the computer program code may cause adding the hinting information to the font data in the predetermined common font data format in response to the determination of the hinting information. The execution of the computer program code may cause that the determination of the hinting information is performed with heuristic operation.

The created web font files may be in Embedded Open Type Format, EOT, and Web Open Font Format, WOFF, and the stored files are the following: a web font file complying Embedded Open Type format, EOT, a web font file complying Web Open Font Format, WOFF, and font file complying TTF format, when the computer program code is executed.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
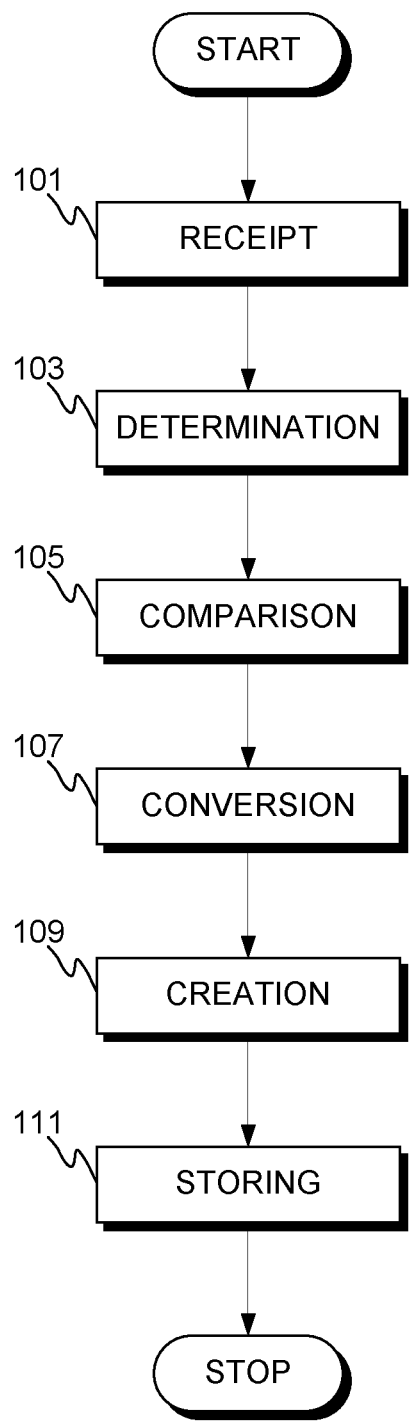
FIG. 1 illustrates an example of the method according to the invention.

The invention relates to a computer and computing environment wherein content within document files is transferred from a system to a terminal device. The system is configured to prepare the content, especially textual content, in such a manner that user of a terminal device may read the textual content with a high quality and with an applicable application software, such as a web browser. A computer implemented method according to an example of the invention for preparing font information related to textual content of the document is disclosed in FIG. 1. At least one goal of the method is to create web fonts efficiently in order to display the content in an application of an outputting terminal with the prepared font information. Within the method at least a document file comprising textual content is received 101 as an input. The document file may e.g. be a PDF document or a Microsoft Office document. The document file may comprise font data complying a font format relating to the textual content of the document file as embedded in the document or the font data may be included in a separate file related to the document, which is also received, e.g. by downloading, as an input. For example, PDF document often comprises one or more embedded font data. In case of the separate font file the main document file comprises at least one pointer to such font file in order to utilize the font information when outputting the content of the document file.

According to the example of the invention the font data complying a font format relating to a textual content of the received document file is determined 103. If the font data is embedded in the received document file as may be in e.g. PDF document, the determination comprises parsing the content of the received document file. The parsing comprises operations by means of which the content and data items within the received document can be identified. More specifically, the parsing step comprises at least extracting one or more data items from the font information embedded in the document file, such as character encoding data, font metrics data and font data. If the font data resides in an external font file, the determination comprises detection of an indication in the received document file that an external font file is relating to the received document. The indication may e.g. be a reference, such as network location, into an external font file from where the external font file may be loaded. The indication may e.g. be arranged in a meta data related to the received document. The system according to the invention is configured to load the external font file. The content of the loaded font file is parsed wherein at least the font data complying a font format is determined by extracting one or more data items from the loaded font file. As an output of the determination step 103 an understanding of the font file and the format of it is received.

Next, the font format of the determined font data is configured to be compared 105 to the font format of the predetermined common font data. The comparison may be based on comparing some predefined characteristics or parameters of the determined font data and the predetermined common font data format in order to determine if the formats are the same or not. The characteristics or parameters may be directly available in the font file or they may be determined by mathematical operations performed to the font file, or the content of the font file, relating to the received document file. For example, in some implementation of the invention the format of a font data is determined from so called font meta data which may e.g. be stored in a header information of the font data. Alternatively or in addition, the determination may be arranged so that the font data in the font file is loaded and analyzed and the information is compared to comparison data maintained and stored in the system, or any entity accessible by the system.

According to the example of the invention if the comparison indicates mismatch of the font format of the determined font data relating to the received document file and the predetermined common font data format, the font format of the font data relating to the received document file is configured to be converted 107 to the predetermined common font data format. The mismatching as an output of the comparison shall be understood to comprise any way to compare two targets to each other and to conclude that the targets are not the same in a sense as defined for the comparison. The conversion may be configured to be performed in a manner that the format of the source font data is converted to a format of the destination font data by using a conversion table at least partly in the operation. The conversion table may comprise information on the coding for converting a first format to a second format. Moreover, it is important to take into account the source font format and the destination format in order to understand what information can be transferred over the conversion and what is lost during the conversion. As an output of the conversion a font file in a predetermined common font data format is created 109.

According to an example of the invention the predetermined common font data format and thus the format into which the font format of the font data relating to the received document is converted is predefined in the system performing the method. According to an example of the invention the predetermined common font data format is TrueType Font (TTF) format. TrueType Font format is an optimal common font data format as it has been used by popular desktop operating systems since 1991, and thus there are a good variety of tools available for processing TTF files. Such processing may, for example, comprise error correction, quality improvement, meta data enhancement or conversion to some other font format/s. Further, the file structure of TTF is generic enough to allow modification and data completion of font data in other formats in a fast way. Moreover, the TTF format is generally well supported by different client-side software products and it can even be delivered to outputting terminal device as such for representation. Also, the rasterization of TTF format may be performed with limited resources, such as computing power and/or memory space, in the terminal device, which makes it applicable to use as such in the outputting if needed.

As the conversion is performed and a font file in a predetermined common font data format is created 109 the computer implemented method according to the invention is configured to create 109 at least one predetermined web font file from the created font file. Web fonts allow X/HTML content to use fonts that are not installed on the viewer's terminal device, but instead they are prepared and delivered or downloaded to the terminal device as separate files combining the font data, font metrics and one or more encoding tables in order to produce a structurally valid font. According to an example of the invention the predetermined web font file is created 109 from the created font file according to predefined instruction set in the system. In the creation of the web font file for example the following operations may be performed:

checking if meta data in the font data matches with target web font structures and if not the meta data is corrected accordingly (e.g. Font Name and Font Family Name fields)

checking if the name table entity matches in size with the target web font structures (e.g. TTF name table) and if mismatch is found, the size is adjusted accordingly completing and/or correction of meta data in order to confirm that a correct web font is selected (e.g. Font Subfamily Name (Classification) field)

confirming that meta data related to embedding information are correct from target web font point of view and if not the meta data is corrected accordingly (e.g. Embedding Bits (OS2 fsType) are set to No-Embedding)

confirming the length of meta data fields (e.g. Font Family Name) matches with the target web font file and adjusting the length of the field accordingly All in all, during the creation it is confirmed that the created web font file comprises all the necessary information in a correct way in order to use the web font data in the terminal device. According to an example of the invention the created web font file is at least one of the following: Embedded Open Type (EOT) or Web Open Font Format (WOFF). Generally speaking the created web font file or files may be any other, e.g. web font file complying the Open-Type format.

Finally, the created at least one web font file is configured to be stored 111 in a memory of the system. Additionally, the created font file in the predetermined common font data format may also be stored in the memory of the system as an downloadable font with any other created font file or web font file. The stored web font files, or font files, may be delivered to the terminal in response to a request or automatically. For example, the stored files may be a web font file complying EOT format, a web font file complying WOFF format and one additional downloadable font file, such as the common format (e.g. a file complying TTF format).

The content of the received document may also be prepared in any other manner in addition to the preparation of the font information as described above. As a whole the final outcome of the process with respect to the textual content of the received document may be that a HTML text file is created comprising the textual content to be output. Secondly, at least one web font file is configured to be created as well as a separate CSS (Cascading StyleSheet) file. The CSS file comprises the style and formatting instructions originating from the source document file, but it may also comprise one or more declaration of the web font files and possibly to any additional font file, such as to the font file of common format. The declaration indicates to the application, such as web browser, residing in the terminal device the types of the web font files available in the context of textual, and other, content. For example, in some example of the invention the CSS file may declare TTF, WOFF and EOT web font files which are then downloaded and used in the terminal application according to an internal logic defined in the application. For example, it may be arranged that the web fonts may be configured to be used in the order as declared in the CSS file. In some example of the invention the system configured to perform the method as described may be configured to maintain piece of information which indicates the most commonly used web browsers in terminal devices. As different web font formats are especially applicable to certain web browsers, it may be advantageous to arrange so that the order of declarations of the web font files in the CSS file are defined according to the piece of information telling the prevalence of the web browsers i.e. the most applicable web font file for the most commonly used web font browser is declared first in the CSS file and so on. Alternatively, the system may be configured to determine, from a request originating from the terminal device, which web browser is in use. In response to the determination of the web browser the system is configured to set the order of declarations of the web fonts and any other downloadable font according to preferences for the web browser. Any other criteria defining the order of declaration in the CSS file may also be used.

Figure 2:
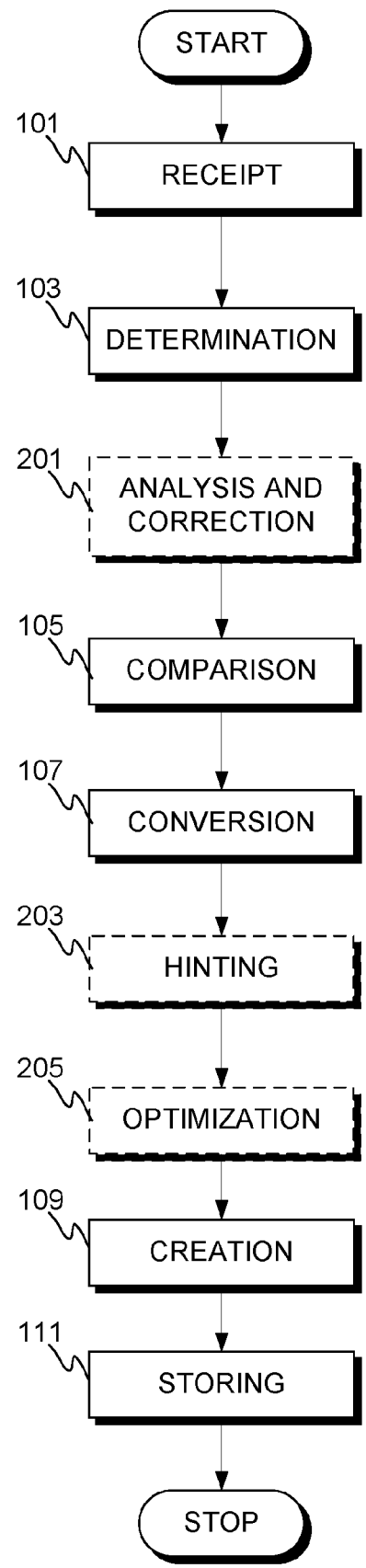
FIG. 2 illustrates another example of the method according to the invention.

In FIG. 2 it is illustrated a more comprehensive computer implemented method for preparing font information. The method according to FIG. 2 comprises additional steps of analyzing and correcting, optimization and hinting. Each of the additional steps in FIG. 2 may be added alone to the method according to FIG. 1 alone or in any combination. Next each of the additional steps is briefly discussed in order to provide information on the advantages of each of the step.

The computer implemented method as described may further comprise a step of analyzing and correcting 201 the font data prior to comparison of the font format of the determined font data to a predetermined common font data format. The advantage is that the analysis and correction step 201 confirms that the data to be processed according to the method of the invention is complete and correct so that all textual information may be arranged visible in the terminal device end. For example, the correction may comprise at least one of the following: forming Unicode compliant character encoding of the determined font data, determining applicable font metrics data on a basis of determined font metrics data, completing the determined font data.

An additional aspect relating to the invention is that when the TTF format is used as a common format a negative effect is that so called hints relating to the font information is non-existent in the source font, or will get lost in the conversion due to the incompatibilities between different font formats. Hints are instructions for improving the appearance of a glyph, which, in turn, is a representation of one or more characters in the font information. Hints typically control selected distances, proportions and pixel patterns of the glyphs, for example. Applying hints will produce visibly improved rasterization result of a glyph when rasterization is carried out with limited target resolution. Without hints, finer details of a glyph relevant to readability of the text, may not be produced sufficiently well due limited raster resolution. According to some example of the invention the computer implemented method as described further comprises a step 203 of analyzing if the converted font data, i.e. the font data in the predetermined common font data format, comprises hinting information and in response to a detection of absence of hinting information determining the hinting information to the font data in the predetermined common font data format prior to creating the at least one web font file. The analysis if the font data in the predetermined common font data format comprises hinting information may comprise a detection of predetermined data structures in the font data. The determined hinting information is configured to be added to the created font file of predetermined common font data format in response to the determination of the hinting information. The determination of the hinting information 203 may be performed with one or more heuristic operations. The principle in the creation of hinting information is that the each glyph in the font data in TTF format, or any other compatible common font format, is scanned and the features are detected. Further, operations relating to widths and heights of the glyphs are performed, such as normalizing the glyph information. The predetermined important features are aligned in the glyphs and interpolation operations are defined. All in all, instructions to improve the appearance of glyphs are defined. Creating and adding the hinting information to font data prior to the creation of web fonts improves the result of rendition of the font data, especially when the font data is rendered in a small resolution, e.g. when the width of glyphs is below 10 pixels.

Furthermore, in some example of the invention the font data in the converted font file may be optimized 205 prior to creation of a font file in a predetermined common font data format and prior to creation of one or more web font files. The optimization 205 may be needed in order to optimize the amount of information to be included into the font file in a predetermined common font data format and thus ending into one or more web font files. This may be arranged so that the glyphs to be included in the files are only those, which are needed to produce the original textual content with any corrected information in the outputting end. This operation is called font subsetting. The subsetting function is configured to go through the textual content originating from the input document file, map the characters used in the textual content and in response to the mapping to select only, or at least, those glyphs which are used and therefore needed when outputting the textual content. The subsetting function may also be configured to detect that the available font data may be incomplete, i.e. it does not comprise all the glyphs needed, and in response to detection the subsetting function may be configured to choose alternative glyphs from some other font information with similar, or at least almost similar, visual characteristics. An example of the advantage in performing the font subsetting is when the font information comprises thousands of characters. If the whole font information is embedded in the output file, the size of output files becomes large, which may have negative impact for the transfer of the output files. Thus, it is advantageous to perform the subsetting as described so that the size of the output files can be optimized. A further advantage of subsetting relates to security issues. Namely, as only those glyphs are included in the data file, which are needed to produce the textual content of the original document, the font information cannot be used anywhere but with the original document or any derivative of it.

Figure 3:
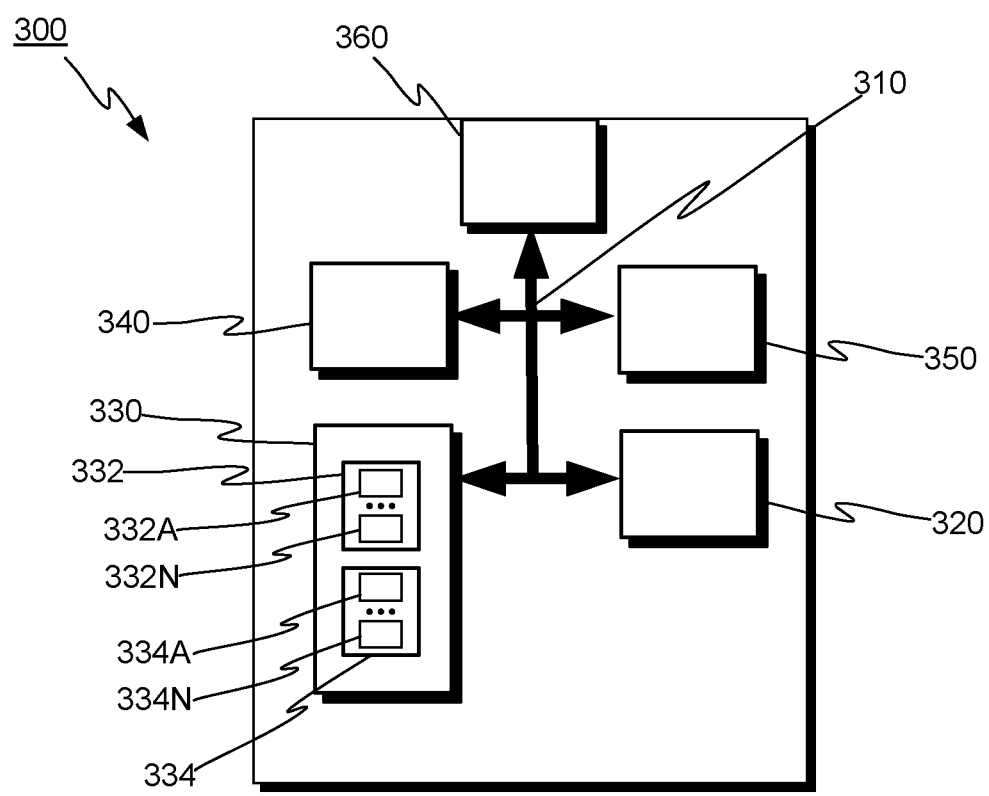
FIG. 3 illustrates an example of the system according to the invention.

The invention also relates to a system which is configured to implement the method as described above. A system according to an example of the invention is illustrated in FIG. 3. The system 300 comprises, for example, a bus 310, a processor 320, a memory 330, input means 340, output means 350, and a communication interface 360. The bus 310 may include means or methods that enable communication among the elements of the system 300. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device, which comprises necessary hardware and computer program code stored in a memory, may be configured to implement the method as described.

The processor 320 may comprise one or more conventional processors, one or more microprocessors, or one or more processing logics, or any combination of these, that interprets and executes instructions defined by portions of computer program code. The memory 330 may comprise a random access memory (RAM) 332 and/or a read only memory (ROM) 334. The RAM 332 may store information and instructions in a form of portions of computer program code 332A-332N for execution by the processor 320. The ROM 334 may include a conventional ROM device or another type of a static storage device that is configured to store static information and instructions in a form of portions of computer program code 334A-334N for use by the processor 320. The RAM 332 and ROM 334 may be implemented with one or more corresponding memory elements.

The input means 340 may comprise a conventional mechanism that permits inputting information to the system 300, such as a keyboard, a mouse, a pen, a touch screen, voice recognition and/or biometric mechanisms, CD/DVD/Blue-ray drive etc. The output means 350 may comprise a conventional mechanism that outputs information, including a display, a printer, a speaker, etc. The input and output means are not necessarily implemented into the system 300, but may be coupled to the system 300 with some known interfaces either wirelessly or in a wired manner when needed. In some examples of the invention the system does not comprise any input means 340 or output means 350 as the system operates as a standalone entity, which is controlled externally through the communication interface 360.

The communication interface 360 may enable the system 300 to communicate with other elements and/or systems, such as networks, as well as with client terminals either directly or indirectly over a network.

The system 300 may perform the operations as described above in response to the processor 320 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 360. The software instructions may cause the processor 320 to perform method steps and processes as described and thus to enable the operation of the system 300 according to an example of the invention.

As said, FIG. 3 illustrates an example of the system 300 according to the invention. The elements as disclosed in FIG. 3 do not necessarily exist in all implementations of the system 300. For example, the system 300 may not comprise input means 340 and output means 350, but the system 300 may be accessed through the communication interface 360 with applicable devices and systems. As well, the number and type of memories may vary. Further, the amount of portions of computer program code may depend on the implementation.

The system 300 is configured, by means of at least part of the mentioned elements, to implement the method according to an example of the invention. The system 300 may be any device that receives the content data as an input through e.g. the communication interface 360, performs the described method steps and returns or forwards the processed image content data further.

An example of the invention also relates to a non-transitory computer-readable storage medium, which stores at least portions of computer program code, wherein the portions of computer program code are computer-executable to implement the method steps in the system as described. In general, the computer-readable storage medium may include a storage medium or memory medium, such as magnetic or optical media e.g. disc, DVD/CD-ROM, volatile or non-volatile media, such as RAM.

In the specification it is said that the document file and possibly the external font file are received as an input to the process. The input to the process may happen when a user has requested certain document comprising textual content. The system responding to the user request may be configured to perform the process according to the invention prior to delivering any information to user's terminal device. Alternatively or in addition, a system arranged to store document files may be configured to perform the described process to the document data when a document file is stored in the system. The output files of the process are configured to be stored in the system for delivery when a document file is requested by a user.

The invention is mainly described here in a situation where the received document comprises only textual content. Worthwhile to mention is that in some cases the received document may also contain image content with the textual content. In such a situation the image content and textual content may be separated from each other and apply the invention to the textual content as described in response to the separation of the different content types from each other.

The advantage of the invention is that one can create necessary web fonts and any possible downloadable font data files by means of which at least most of the web browsers are supported i.e. the textual content can be visualized with high quality. Relying on the common format provides means for preparing the font information in a unified way, which makes it easier to add e.g. hinting information as well as any other described operation, such as subsetting, to font data. Thus, the processing methods for the converted font data are not tied to the input formats, which makes the processing more powerful and simpler.

Moreover, utilization the TTF format as a common format provides the further advantage that it can be directly declared in the CSS file since it is directly applicable to be utilized in at least some web browsers.

Some advantageous embodiments according to the invention were described above. The invention is not limited to the embodiments described. The inventive idea can be applied in numerous ways within the scope defined by the claims attached hereto.

What is claimed is:

1. A computer implemented method for preparing font information related to textual content of a document, the method comprising:
   receiving a document file as an input;
   determining at least a font data complying a font format relating to a textual content of the received document file;
   comparing the font format of the determined font data to a predetermined common font data format;
   converting the font format of the font data to the predetermined common font data format if the comparison indicates a mismatch of the compared font data formats;
   optimizing the converted font data at least by selecting glyphs from the converted font data that correspond to glyphs in the received document file;
   creating a document-specific font file in the predetermined common font data format from the converted and optimized font data;
   creating a plurality of document-specific web font files from the created document-specific font file; and
   storing at least the document-specific font file complying with the predetermined common font data format and the plurality of document-specific predetermined web font files in a memory.

2. The computer implemented method of claim 1, wherein the determination of at least the font data complying a font format is performed by parsing the content of the received document file, the parsing comprising at least extracting one or more data items comprising the font data from font information embedded in the received document file.

3. The computer implemented method of claim 1, wherein the determination of at least the font data comprises detection of an indication in the received document file that an external font file is relating to the received document file, loading the external font file and parsing the content of the loaded font file, the parsing comprising at least extracting one or more data items comprising the font data from the loaded font file.

4. The computer implemented method of claim 1, the method further comprising:
   analyzing and correcting font information prior to comparison of the font format of the determined font data to the predetermined common font data format.

5. The computer implemented method of claim 4, wherein the correction comprising at least one of the following:
   forming Unicode compliant character encoding of the determined font data, determining applicable font metrics data on a basis of determined font metrics data, and completing the determined font data.

6. The computer implemented method of claim 1, the method further comprising:
   determining if the font data in the predetermined common font data format comprises hinting information and in response to a detection of absence of hinting information determining the hinting information to the font data in the predetermined common font data format prior to creating the plurality of document-specific web font files.

7. The computer implemented method of claim 6, the method further comprising:
   adding the hinting information to the font data in the predetermined common font data format in response to the determination of the hinting information.

8. The computer implemented method of claim 6, wherein the determination of the hinting information is performed with heuristic operation.

9. The computer implemented method of claim 1, wherein the created document-specific web font files are in Embedded Open Type Format (EOT format), and Web Open Font Format (WOFF), and the stored files are the following: a web font file complying EOT format, and a web font file complying WOFF, and font file complying the predetermined common font data format.

10. A system for preparing font information related to textual content of a document, comprising:
   one or more processors; and
   a memory having computer program code stored therein, the memory and the computer program code configured to, upon execution of the computer program code by the one or more processors, cause the system at least to:
      receive a document file as an input,
      determine at least a font data complying a font format relating to a textual con-tent of the received document file,
      compare the font format of the determined font data to a predetermined common font data format,
      convert the font format of the font data to the predetermined common font data format if the comparison indicates a mismatch of the compared font data formats,
      optimize the converted font data at least by selecting glyphs from the converted font data that corresponds to glyphs in the received document file,
      create a document-specific font file in the predetermined common font data format from the converted and optimized font data,
      create a plurality of document-specific web font files from the created document-specific font file, and
      store at least the font file complying with the predetermined common font data format and the at plurality of predetermined web font files in a memory.

11. The system of claim 10, wherein the system is configured to determine at least the font data complying a font format by parsing the content of the received document file, the parsing comprising at least extracting one or more data items comprising the font data from font information embedded in the received document file.

12. The system of claim 10, wherein the system is configured to determine at least the font data by detecting an indication in the received document file that an external font file is relating to the received document file, by loading the external font file and by parsing the content of the loaded font file, the parsing comprising at least extracting one or more data items comprising the font data from the loaded font file.

13. The system of claim 10, wherein the system is further configured to analyze and correct font information prior to comparison of the font format of the determined font data to the predetermined common font data format.

14. The system of claim 10, the system is further configured to determine if the font data in the predetermined common font data format comprises hinting information and in response to a detection of absence of hinting information to determine the hinting information to the font data in the predetermined common font data format prior to creating the plurality of document-specific web font files.

15. The system of claim 14, the system is further configured to add the hinting information to the font data in the predetermined common font data format in response to the determination of the hinting information.

16. The system of claim 14, wherein the system is configured to determine the hinting information by performing at least one heuristic operation.

17. The system of claim 10, wherein the system is configured to create document-specific web font files in format of Embedded Open Type (EOT format), and Web Open Font (WOFF), and to store: a web font file complying EOT format, and a web font file complying WOFF, and font file complying the predetermined common font data format.

18. A non-transitory computer readable medium, having stored thereon computer program code that, when executed by a processor device of a system, causes the system to perform a method for preparing font information related to textual content of a document, comprising;
receiving a document file as an input;
determining at least a font data complying a font format relating to a textual content of the received document file;
comparing the font format of the determined font data to a predetermined common font data format;
converting the font format of the font data to the predetermined common font data format if the comparison indicates a mismatch of the compared font data formats;
optimizing the converted font data at least by selecting glyphs from the converted font data that corresponds to glyphs in the received document file;
creating a document-specific font file in the predetermined common font data format from the converted and optimized font data;
creating a plurality of web font files from the created document-specific font file; and
storing at least the document-specific font file complying with the predetermined common font data format and the plurality of document-specific predetermined web font files in a memory.

19. The non-transitory computer readable medium of claim 18, wherein the determination of at least the font data complying a font format is performed by parsing the content of the received document file, the parsing comprising at least extracting one or more data items comprising the font data from font in-formation embedded in the received document file.

20. The non-transitory computer readable medium of claim 18, wherein the determination of at least the font data comprises detection of an indication in the received document file that an external font file is relating to the received document file, loading the external font file and parsing the content of the loaded font file, the parsing comprising at least extracting one or more data items comprising the font data from the loaded font file.

21. The non-transitory computer readable medium of claim 18, wherein the computer program code further causes the system to perform a step of analyzing and correcting font information prior to comparison of the font format of the determined font data to the predetermined common font data format.

22. The non-transitory computer readable medium of claim 21, wherein the correction comprises at least one of the following: forming Unicode compliant character encoding of the determined font data, determining applicable font metrics data on a basis of determined font metrics data, and completing the determined font data.

23. The non-transitory computer readable medium of claim 18, wherein the computer program code further causes the system to perform a step of determining if the font data in the predetermined common font data format comprises hinting information and in response to a detection of absence of hinting information determining the hinting information to the font data in the predetermined common font data format prior to creating the plurality of document-specific web font files.

24. The non-transitory computer readable medium of claim 23, wherein the computer program code further causes the system to perform a step of adding the hinting information to the font data in the predetermined common font data format in response to the determination of the hinting information.

25. The non-transitory computer readable medium of claim 23, wherein the determination of the hinting information is performed with heuristic operation.

26. The non-transitory computer readable medium of claim 18, wherein the created document-specific web font files are in Embedded Open Type Format (EOT format), and Web Open Font Format (WOFF), and the stored files are the following: a web font file complying EOT format, a web font file complying WOFF, and font file complying the predetermined common font data format.

* * * * *